(12) United States Patent
Maruyama

(10) Patent No.: US 6,965,586 B1
(45) Date of Patent: Nov. 15, 2005

(54) INITIAL SYNCHRONIZATION METHOD IN DS-CDMA INTER-BASE STATION ASYNCHRONOUS CELLULAR SCHEME

(75) Inventor: Hidenori Maruyama, Tokyo (JP)

(73) Assignee: NEC Corporation, Tokyo (JP)

( * ) Notice: Subject to any disclaimer, the term of this patent is extended or adjusted under 35 U.S.C. 154(b) by 712 days.

(21) Appl. No.: 09/712,920

(22) Filed: Nov. 16, 2000

(30) Foreign Application Priority Data

Nov. 18, 1999 (JP) .................................. 11-327946

(51) Int. Cl.[7] .......................... H04J 3/06; H04B 7/216
(52) U.S. Cl. ...................................... 370/335; 370/350
(58) Field of Search ............................... 370/324, 350, 370/395.62, 503, 509–515, 479, 354, 359, 370/365, 367, 369; 375/150, 134, 137, 147, 375/149, 145, 240, 341, 261, 262, 343, 351–346

(56) References Cited

U.S. PATENT DOCUMENTS

| | | | | |
|---|---|---|---|---|
| 5,910,948 A | * | 6/1999 | Shou et al. .................. | 370/335 |
| 5,940,433 A | * | 8/1999 | Sawahashi et al. ......... | 375/149 |
| 6,038,250 A | * | 3/2000 | Shou et al. .................. | 375/143 |
| 6,167,037 A | * | 12/2000 | Higuchi et al. ............. | 370/335 |
| 6,625,200 B1 | * | 9/2003 | Dent ........................... | 375/142 |
| 2004/0005020 A1 | * | 1/2004 | Dent ........................... | 375/343 |

FOREIGN PATENT DOCUMENTS

| | | | | |
|---|---|---|---|---|
| EP | 930723 A2 | * | 7/1999 | ......... H04B 1/707 |
| JP | 10-126380 | | 5/1998 | |
| JP | 10-200447 | | 7/1998 | |
| JP | 11-196460 A | | 7/1999 | |
| JP | 11-205864 | | 7/1999 | |

OTHER PUBLICATIONS

Han-Sup Lee, Hyun-Myung Pyo, and Dong-In Kim, Cell search scheme using I/Q multiplexed code assignment in asynchronou W-CDMA system, May 16-20, 1999, IEEE 49th Vehicular Technology Conference (VTC), IEEE, pp. 1560-1564.*

K. Higuchi, M. Sawahashi, and F. Adachi, Fast cell search algorithm in DS-CDMA Mobile Radio Using Long Spreading Codes, IEEE 47th Vehicular Technology Conference (VTC), May 4-7, 1997, pp. 1430-1434.*

F. Adachi and M. Sawahashi, Wideband Multi-rate DS-CDMA Mobile Radio Access, 1997 Asia Pacific Microwave Conference Proceedings (APMC '97), Dec. 2-5, 1997, vol. 1, pp. 149-152.*

F. Adachi and M. Sawahashi, Wideband Multi-rate DS-CDMA for Next Generation Mobile Communications Systems, 1997 Wireless Communications Conference Proceedings, Aug. 11-13, pp. 57-62.*

(Continued)

*Primary Examiner*—Duc Ho
(74) *Attorney, Agent, or Firm*—Sughrue Mion, PLLC

(57) ABSTRACT

An initial synchronization method in a DS-CDMA inter-base station asynchronous cellular scheme of transmitting a spreading code sequence, includes: a first stage that detects correlation power values between the common identification code and a received signal by using a correlator and performs a threshold determination; a second stage that detects a correlation value between the received signal and each long code group identification short code, sets a group having a maximum correlation sum as a group, detects a slot in which a head of the pattern is obtained as a start slot of a frame, and compares an arbitrarily set threshold with the maximum correlation sum; and a third stage that sequentially generates replica codes of long codes and short codes, performs correlation detection for the obtained synchronization timing, and performs long code correlation detection.

10 Claims, 7 Drawing Sheets

OTHER PUBLICATIONS

K. Higuchi, M. Sawahashi and F. Adachi, Experiments on fast cell search algorithm for intercell asynchronous W-CDMA mobile radio, Electronic Letters, Jun. 24, 1999, vol. 35, No. 13, pp. 1046-1047.*

K. Higuchi, Y. Hanada, M. Sawahashi, and F. Adachi, Experimental Evaluation of 3-step Cell Search Method in W-CDMA Mob Radio, IEEE 51st Vehicular Technology Conference Proceedings (VTC), May 15-18, 2000, vol. 1, pp. 303-307.*

Dong In Kim and Yu Ro Lee, I/Q Multiplexed Code Assignment for Fast Cell Search in Asynchronous DS/CDMA Cellular Systems, IEEE Communications Letters, vol. 2, No. 6, Jun. 1998, pp. 159-161.*

Dong In Kim and Yu Ro Lee, I/Q Multiplexed Code Assignment for Fast Cell Search under Hierarchical Cell Structure, IEEE 1998 International Conference on Universal Personal Communications (ICUPC '98), vol. 1, Oct. 5-9, 1998, pp. 389-393.*

Dong In Kim and Yu Ro Lee, Fast Cell Search Using I/Q Multiplexed Code in Asynchronous DS/CDMA Cellular Systems, 1998 IEEE 5th International Symposium on Spread Spectrum Techniques and Applications, Sep. 2-4, 1998, vol. 3, pp. 832-836.*

H. Olofsson, M. Sundelin, M. Edbardsson and E. Dahlman, Cell Search Performance in UTRA, IEEE VTS 50th Vehicular Technology Conference, (VTC 1999), Sep. 19-22, 1999, vol. 2, pp. 934-938.*

J. Nystrom, K. Jamal, Y-P E Wang, R. Esmailzadeh, Comparison of Cell Search Mehtods for Asynchronous Wideband CDMA Cellular Systems, IEEE 1998 International Conference on Universal Personal Communications (ICUPC), Oct. 5-9, 1998, vol. 2. pp. 783-787.*

K. Higuchi et al., "Fast Cell Search Algorithm using Long Code Masking in DS-CDMA Asynchronous Cellular System", The Institute of Electronics Information and Communication Engineers, Technical Report f IEICE, DSP96-118, SAT96-111, RCS96-122, Jan. 1997, pp. 57-63.

* cited by examiner

INITIAL SYNCHRONIZATION METHOD IN DS-CDMA INTER-BASE STATION ASYNCHRONOUS CELLULAR SCHEME

BACKGROUND OF THE INVENTION

1. Field of the Invention

The present invention relates to a DS-CDMA cellular system and, more particularly, to an initial synchronization method for a DS-CDMA (Direct Sequence-Code Division Multiple Access) inter-base station asynchronous cellular scheme.

2. Description of the Prior Art

A CDMA cellular scheme using a wideband DS-CDMA (W-CDMA) scheme is used as a radio access scheme in next-generation mobile communication scheme IMT-2000.

Generally, cellular systems require two kinds of cell searches, namely, an initial cell search by which an initial cell to which a mobile station (MS) is to be connected is caught, and a neighboring cell search by which neighboring cells are searched out during a handover period. Notably in DS-CDMA cellular systems, each of the cells uses the same frequency. For this reason, initial synchronization is required concurrently with the cell search to reduce within ½ chip period the timing error between the spreading code of the received signal and the spreading code replica generated by a receiver.

Such DS-CDMA cellular systems can be categorized into two schemes, namely, inter-base station synchronous systems in which temporal synchronization is performed strictly among all base stations, and inter-base station asynchronous systems in which temporal synchronization is not performed.

Inter-base station synchronous systems achieve inter-base station synchronization using other systems such as the GPS (Global Positioning System). Since each of the base stations uses the same long code with different delays being given to the respective base stations, it suffices to synchronize only the timing of the long code during the initial search. In addition, the neighboring cell search during a handover period can be performed at a higher speed since the mobile station is notified of the code delay information of the neighboring base stations from the base station to which the mobile station belongs.

On the other hand, in inter-base station asynchronous systems, each of the base stations uses a different spreading code in order to identify the base stations. The mobile station needs to identify the spreading codes in performing the initial cell search. When searching neighboring cells during a handover period, the number of spreading codes used in the neighboring base stations can be limited from the base station to which the mobile station belongs. In any case, however, in comparison with inter-base station synchronous system, the search time is longer. When a long code is used for the spreading code, it takes a very long time in the cell search. However, this inter-base station asynchronous system has an advantage in that other systems such as GPS are not required. This allows flexible system expansion from cellular systems to indoor and underground shopping centers.

A cell search scheme capable of solving these problems inherent in the inter-base station asynchronous systems and performing initial synchronization at a high speed is being proposed by Kenichi Higuchi, Mamoru Sawahashi, and Fumiyuki Adachi, in "High Speed Cell Search Method Using Long Code Mask in DS-CDMA Inter-Base Station Asynchronous System", Shingakugihou RCS96-122 (1997-01).

FIG. 1 shows an example of the format of a spreading code in a downstream control channel in the proposed conventional cell search method. FIG. 2 is a flow chart showing the proposed conventional three-stage cell search method.

In the proposed conventional cell search method, a long spreading code in a downstream control channel is masked in predetermined cycles, and a symbol is spread by only a short code common to the respective base stations. The mobile station detects the reception timing of a long code by using this mask symbol to realize a high-speed cell search.

The proposed conventional cell search method will be described in detail below with reference to FIG. 2.

First Stage: Detection of Long Code Timing

First of all, the mobile station detects the correlation of a received signal and a common short code by using a matched filter, and a long code timing detecting section 71 detects the correlation peak value at a mask symbol position. The temporal position at which a maximum correlation output is detected after correlation values corresponding to an arbitrary number of frames are averaged is set as the mask symbol reception timing of a connection destination channel.

Second Stage: Identification of Long Code Group

In the second stage, a long code group detecting section 72 detects the correlation between the received signal at the mask symbol reception timing detected in the first stage and each long code group identification short code. Correlation values corresponding to an arbitrary number of frames are averaged, and a frame timing and a long code group including a long code for spreading the received signal are identified from a long code group identification short code number at which a maximum correlation value is obtained.

Third Stage: Identification of Long Code

In the third stage, a long code is identified. In the mobile station, a long code detecting section 73 sequentially detects the correlation values between the received signal and the long code candidates included in the long code group detected by using the frame timing detected in the second stage. By comparing the detected correlation detection values with each other, threshold determination sections 74 and 75 perform threshold determination. With this operation, a long code is identified. In this case, for each long code timing detection, correlation detection with each long code is performed an arbitrary number of times (which has been set to two) until a cell search is detected. This operation is performed to prevent a cell detection miss caused by a decrease in the reception level of a desired wave due to fading. As a threshold, a maximum correlation peak value in long code timing detection is used. If a correlation detection value exceeds the threshold, a correlation for the long code is detected again to check cell detection. After the check, a frame synchronization detecting section 76 performs data frame synchronization detection. If a detection error occurs, a search count section 77 performs the third stage again by an arbitrary number of times. If this operation is performed beyond a predetermined number of times, the flow of processing returns to the first stage.

As described above, according to the three-stage cell search method proposed in the above reference, a cell search can be executed at a high speed, but faster initial synchronization is required.

In the conventional cell search method, as the probability of erroneous detection increases due to an increase in interference wave power with an increase in the number of users accommodated, a three-stage cell search must be repeated many times, resulting in an increase in search time.

In addition, as the number of long codes to be identified increases, the search time is undesirably prolonged.

SUMMARY OF THE INVENTION

It is an object of the present invention to provide an initial synchronization method in a DS-CDMA inter-base station asynchronous cellular scheme capable of performing a cell search at a higher speed in an inter-base station asynchronous CDMA communication system.

In order to achieve the above object, according to the main aspect of the present invention, in an initial synchronization method in a DS-CDMA inter-base station asynchronous cellular scheme of transmitting a spreading code sequence constituted by a long code unique to each cell and a short code corresponding to each communication channel, an identification code (common identification code) common to each cell in a predetermined period (slot), and a long code group identification short code corresponding to the long code in each cell upon multiplexing the codes, a first stage comprises detecting correlation power values between the common identification code and a received signal by using a correlator, and detecting a long code timing from a corresponding base station on the basis of a maximum value of the correlation power values, and performing threshold determination by comparing the maximum correlation power value with an arbitrary threshold, and performing processing again from the first stage if the maximum correlation power value does not exceed the threshold, a second stage comprises detecting a correlation value between the received signal and each long code group identification short code, and obtaining a sum of the correlation values corresponding to the number of long code group identification short codes in each slot according to a transmission pattern of long code group identification short codes in each predetermined long code group, setting a group having a maximum correlation sum as a group to which a long code of the received signal belongs, detecting a slot in which a head of the pattern is obtained as a start slot of a frame, and comparing an arbitrarily set threshold with the maximum correlation sum and performing processing again from the first stage if the maximum correlation sum does not exceed the threshold, and a third step comprises sequentially generating replica codes of long codes and short codes from long code candidates included in the long code group identified in the second stage, performing correlation detection for the obtained synchronization timing, performing long code correlation detection to check whether the correlation detection value exceeds an arbitrary threshold, returning to the first stage if none of correlation detection values of all long codes exceeds the threshold, and determining a long code exceeding the threshold as a long code of a target cell, performing synchronization detection by using a frame sync signal, completing initial synchronization if synchronization is detected, and returning to the first state if synchronization is not detected.

According to another aspect of the present invention, there is provided a DS-CDMA cellular system characterized by using the initial synchronization method according to the above aspect.

According to the initial synchronization method in the DS-CDMA inter-base station asynchronous cellular scheme, the overall processing efficiency improves and initial synchronization can be performed at a higher speed as compared with the conventional initial synchronization method.

In other words, according to the initial synchronization method in the DS-CDMA inter-base station asynchronous cellular scheme of the present invention, even if the probability of erroneous detection increases due to an increase in interference wave power or the like, the number of times of three-stage cell search can be decreased. In addition, since the cell search can be performed efficiently and quickly, the transmission efficiency and reliability of the apparatus can be improved, and power saving and the like can be attained.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENT

An embodiment of the present invention will be described in detail below with reference to the accompanying drawings.

Figure 3:
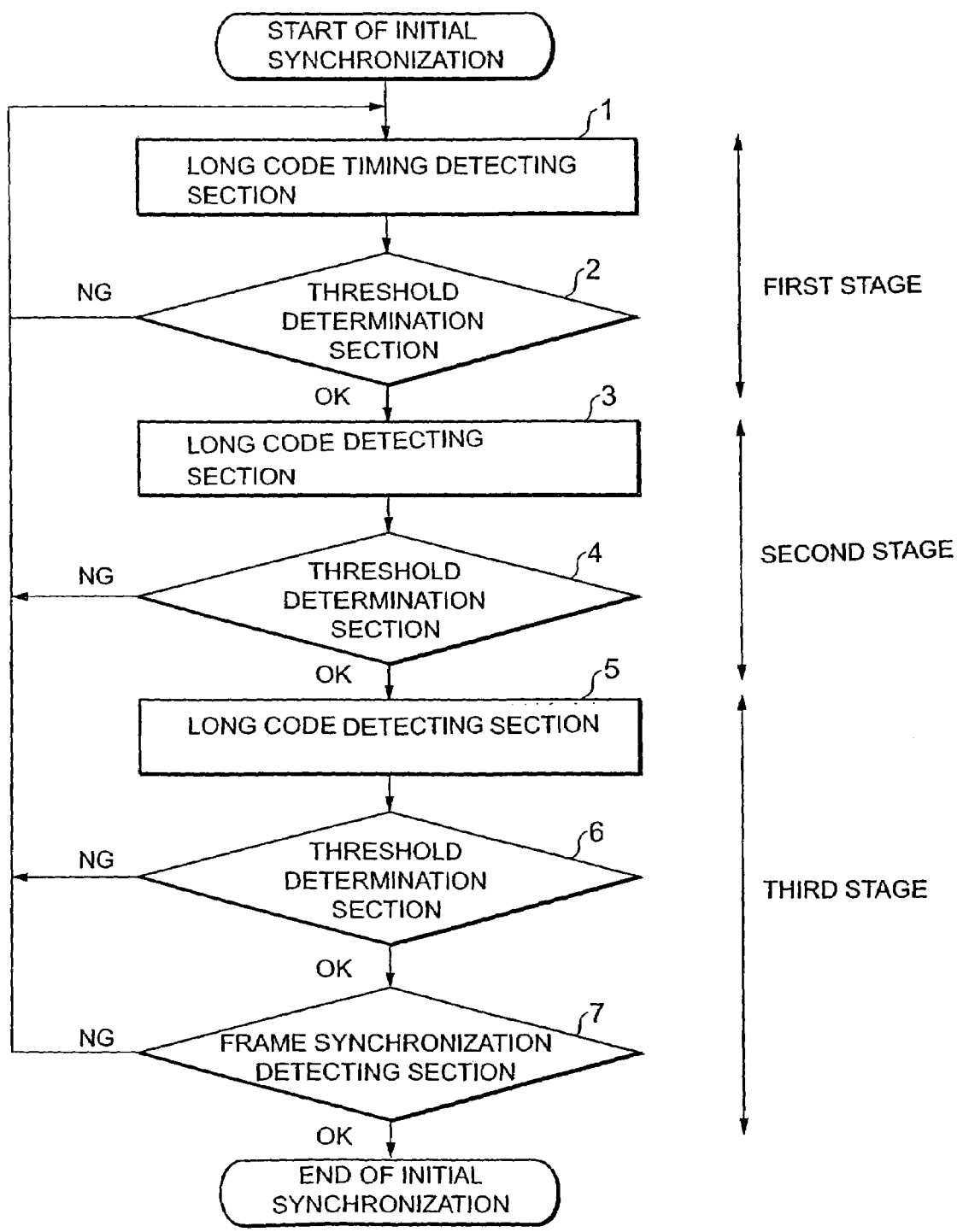
FIG. 3 is a flow chart showing an initial synchronization method in a DS-CDMA inter-base station asynchronous cellular scheme according to an embodiment of the present invention.

FIG. 3 is a flow chart showing an initial synchronization method in a DS-CDMA inter-base station asynchronous cellular scheme according to the present invention.

The DS-CDMA inter-base station asynchronous cellular scheme used in the present invention is comprised of:

a first stage constituted by a long code timing detecting section 1 for detecting a long code timing and a threshold determination section 2 for determining a threshold by comparing the correlation value obtained by the long code timing detecting section 1 with an arbitrary threshold;

a second stage constituted by a long code group detecting section 3 for detecting a long code group and a threshold determination section 4 for determining a threshold by comparing the correlation value obtained by the long code group detecting section 3 with an arbitrary threshold; and a third stage constituted by a long code detecting section 5 for detecting a long code from long code candidates, a threshold determination section 6 for determining a threshold by comparing the correlation value obtained by the long code detecting section 5 with an arbitrary threshold, and a frame synchronization detecting section 7 for performing frame synchronization detection with a detected long code.

The operation of this embodiment will be described next with reference to the flow chart of FIG. 3.

(1) First Stage: Detection of Long Code Timing

First of all, the mobile station detects the correlation power value between a received signal and a common identification code by using a matched filter, and also detects a correlation peak value (maximum correlation power value) at the long code timing (long code timing detecting section 1). After correlation values corresponding to an arbitrary number of frames are averaged, the threshold determination section 2 compares the maximum correlation output value with an arbitrarily determined threshold. If the maximum correlation output value does not exceed the threshold, the first stage is performed again. If the maximum correlation output value exceeds the threshold, the temporal position of the detection is set as the long code reception timing of a connection destination channel.

(2) Second Stage: Identification of Long Code Group

In the second stage, the correlation between the received signal and each long code group identification short code at the long code reception timing detected in the first stage is detected (threshold determination section 2). The correlation between the received signal and each long code group identification short code is detected on the basis of the detected long code timing, and the sum of correlation values corresponding to the number of long code group identification short codes in the respective slots is calculated according to the transmission pattern of long code group identification short codes in the respective long code groups. A group having a maximum correlation sum is set as a group to which the long code of the received signal belongs, and a slot in which the head of this pattern is obtained is detected as the start slot of the frame. The arbitrarily set threshold is then compared with the maximum correlation sum. If the maximum correlation value does not exceed the threshold, the processing is performed again from the first stage.

(3) Third Stage: Identification of Long Code

In the third stage, a long code is identified. The mobile station detects the correlation between the received signal and each of all scramble code candidates included in the scramble code group detected by using the frame timing detected in the second stage, and the threshold determination section determines a threshold, thereby identifying a scramble code. As this threshold, the maximum correlation peak value in the long code timing detection is used. If the threshold determination section 6 determines that the correlation detection value exceeds the threshold, synchronization is detected by using the identified long code. If the synchronization is established, long code synchronization is completed. If the correlation detection values for all long code candidates do not exceed the threshold, a cell search failure is determined, and the flow returns to the first stage to perform a search again. When threshold determination is successful, but frame synchronization detection has failed, the flow also returns to the first stage to perform a search again.

An example of the long code timing detecting section 1 and threshold determination section 2 in the first stage shown in FIG. 3 will be described in detail next with reference to FIG. 4.

Figure 4:
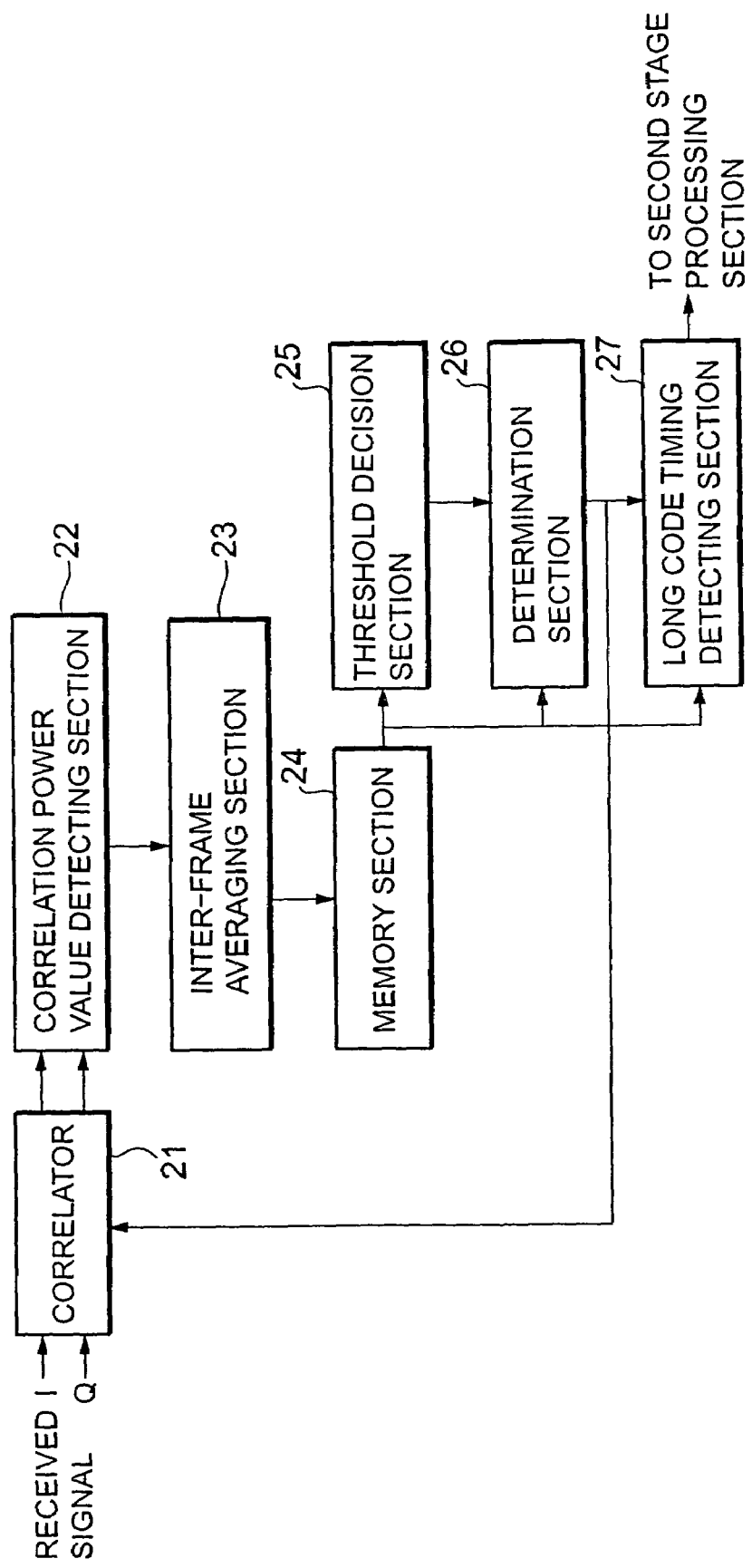
FIG. 4 is a block diagram showing an example of an arrangement in the first stage in the embodiment shown in FIG. 3.

FIG. 4 is a block diagram showing an example of the arrangement of the first stage in the embodiment shown in FIG. 3.

The first stage is comprised of a correlator 21 for detecting with a common identification code the correlation values of a real-part amplitude value (I) and imaginary-part amplitude value (Q), which are received by an antenna, quadrature-demodulated by a radio section, and A/D-converted in units of 1/2 chips, a correlation power value detecting section 22 for obtaining the correlation power values between the respective correlation output values detected by the correlator 21, an inter-frame averaging section 23 for averaging the correlation power values from the correlation power value detecting section 22 between the respective frames, a memory section 24 for holding the average correlation power value obtained by the inter-frame averaging section 23, a threshold decision section 25 for deciding a threshold by using the correlation power value held in the memory section 24, a determination section 26 for determining the correlation power value held in the memory section 24 by using the threshold decided by the threshold decision section 25, and a long code timing detecting section 27 for, if it is determined that an average correlation power value exceeds the threshold value, detecting a long code timing and notifying the second stage processing section of the long code timing.

Figure 1:
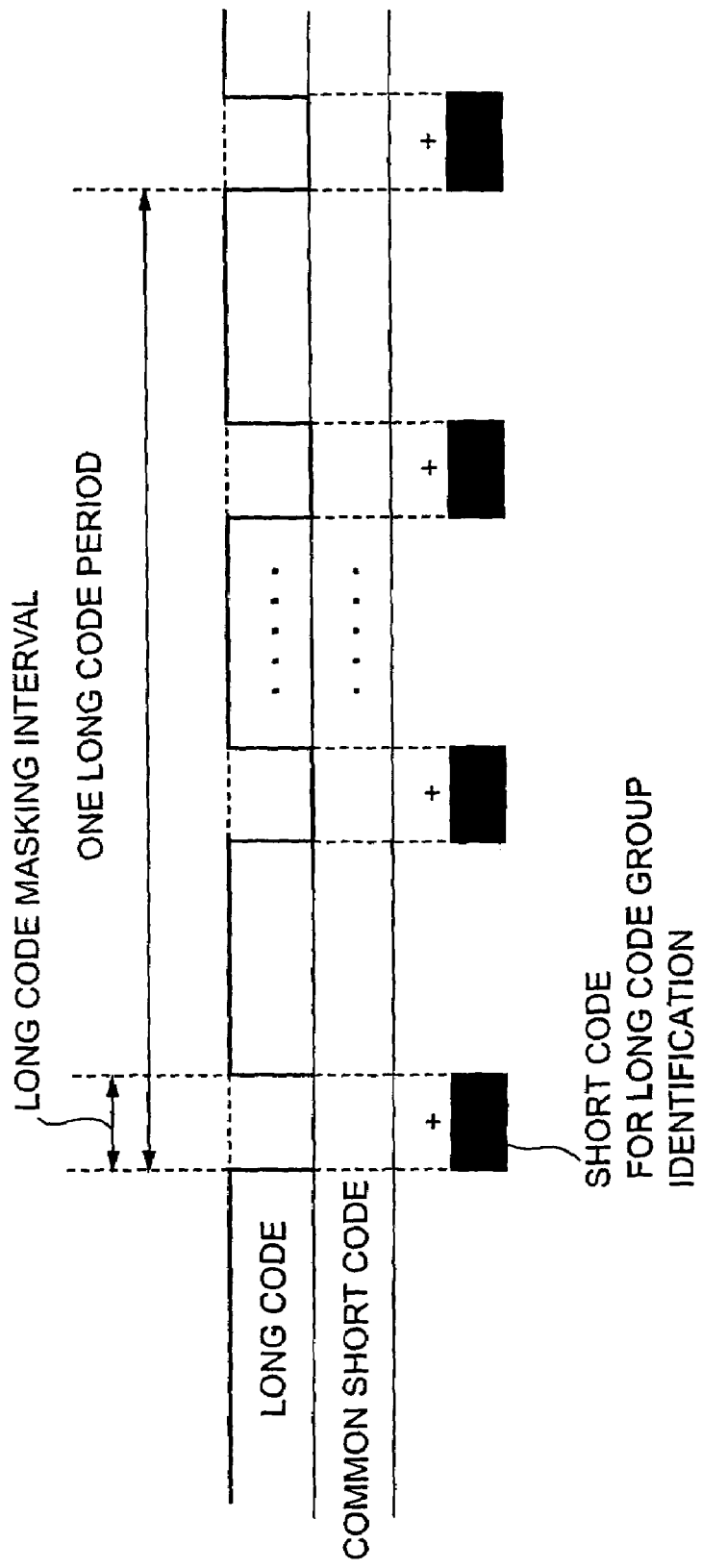
FIG. 1 is a view showing the format of a spreading code in a downstream control channel in the prior art.
Figure 2:
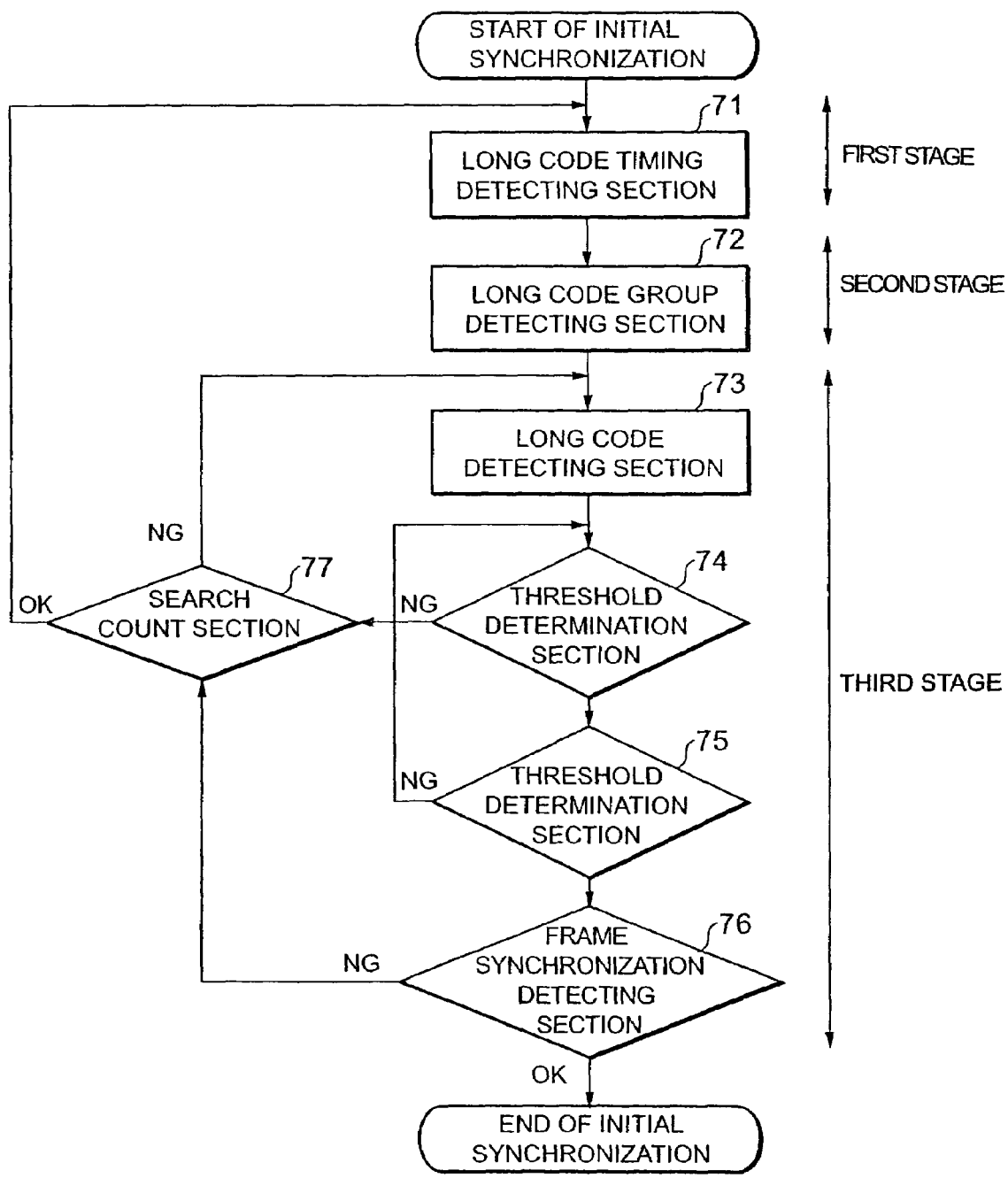
FIG. 2 is a flow chart showing processing in the prior art.

The operation of the first stage shown in FIG. 1 will be described in detail next.

The correlator 21 detects with a common identification code the correlation values between a real-part amplitude value and imaginary-part amplitude value, which are received by the antenna, quadrature-demodulated by a radio section, and A/D-converted in units of 1/2 chips. The correlator 21 detects the correlation values between the real-part amplitude value and the imaginary-part amplitude value by using a matched filter, and outputs the correlation values to the correlation power value detecting section 22.

The correlation power value detecting section 22 calculates $I^2+Q^2$ by using the respective correlation values obtained from the real- and imaginary-part amplitude values to obtain a correlation power value. In this case, the correlation power value detecting section 22 may simply calculate a correlation power value by performing only four fundamental operations of arithmetic, e.g., MAX(|I|or |Q|) +0.5 MIN(|I|or |Q|) without performing any squaring operation.

To increase the S/N ratio, the inter-frame averaging section 23 averages the correlation power values in units of slot periods generated by a common identification code during an arbitrary frame period designated in advance, and the average inter-slot correlation power value is held in the memory section 24.

As average inter-slot correlation power value, the threshold decision section 25 obtains the average of correlation power values from which given correlation power values ranging from the maximum correlation power value to an correlation power value of an arbitrary ordinal number therefrom and correlation values before and after the given correlation power values are excluded, and sets the average as an arbitrary threshold.

Figure 5:
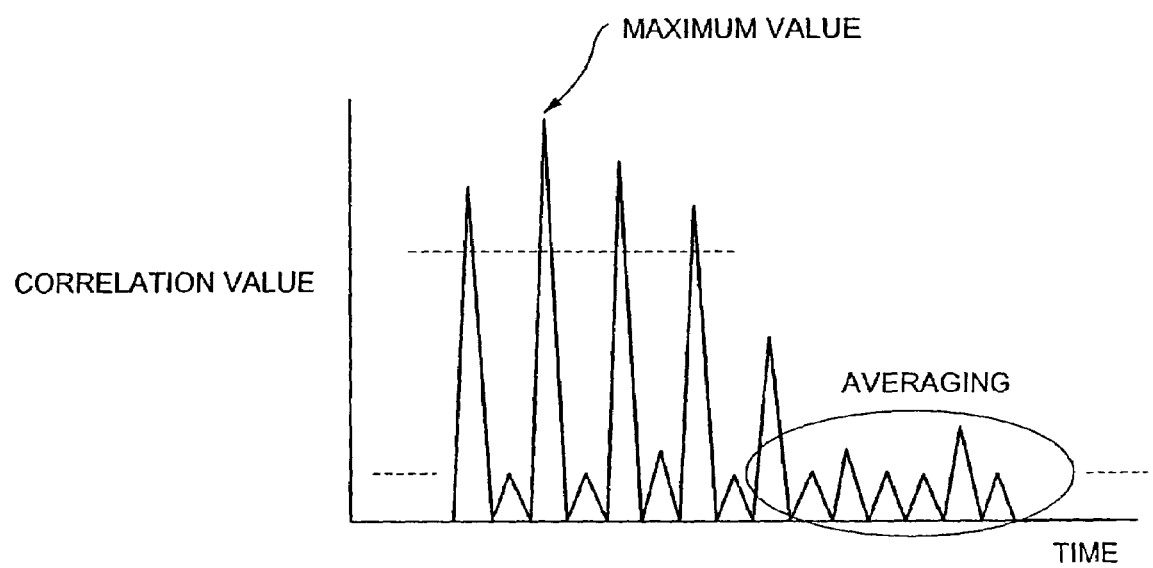
FIG. 5 is a view for explaining how a threshold is set in the first stage in the embodiment shown in FIG. 3.

FIG. 5 explains how a threshold is set.

Referring to FIG. 5, given correlation values ranging from the maximum correlation power value to the fourth correlation value and correlation values before and after the given correlation power values are obtained, and the average of correlation power values from which the obtained correlation power values are omitted is obtained. In this case, a window may be set in some part between slots to determine a threshold within this range.

The determination section 26 shown in FIG. 4 determines the decided threshold value. If the maximum correlation power value exceeds the threshold, the timing of the maximum correlation power value is set as a long code timing, and the long code timing detecting section 27 notifies the second stage processing section of the long code timing. If the maximum correlation power value does not exceed the threshold value, the processing in the first stage is performed again.

An example of each of the long code group detecting section 3 and threshold determination section 4 in the second stage shown in FIG. 3 will be described next with reference to FIG. 6.

Figure 6:
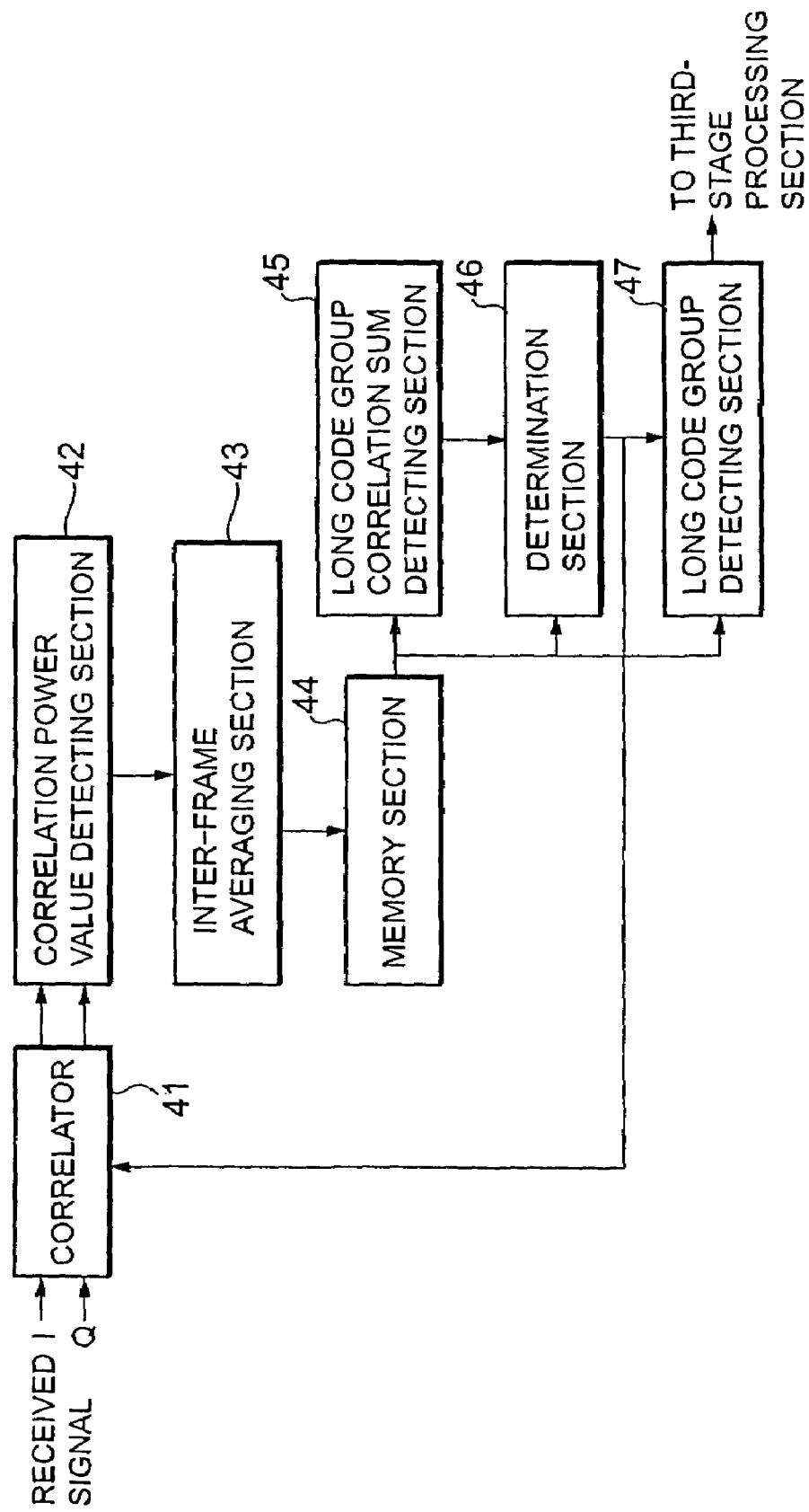
FIG. 6 is a block diagram showing an example of an arrangement in the second stage in the embodiment shown in FIG. 3.

FIG. 6 is a block diagram showing an example of the arrangement of the second stage in the embodiment shown in FIG. 3.

The second stage is comprised of a correlator 41 for detecting at the long code timing notified from the first stage the correlation values between each long code group identification short code and the real-part amplitude value (I) and imaginary-part amplitude value (Q), which are received by the antenna, quadrature-demodulated by the radio section, and A/D-converted in units of 1/2 chips, a correlation power value detecting section 42 for obtaining correlation power values from the respective correlation output values detected by the correlator 41, an inter-frame averaging section 43 for averaging the correlation power values from the correlation power value detecting section 42 between frames, a memory section 44 for holding the average correlation power value obtained by the inter-frame averaging section 43, a long code group correlation sum detecting section 45 for obtaining the sum of the correlation power values held in the memory section 44 according to a transmission pattern based on each predetermined long code group identification short code, a determination section 46 for determining an arbitrary threshold from each correlation sum detected by the long code group correlation sum detecting section 45, and determining a threshold, and a long code timing detecting section 47 for, when the determination section 46 determines that the maximum correlation sum exceeds the threshold, detecting a frame timing as a group to which the long code belongs.

The operation of the second stage shown in FIG. 6 will be described in detail next.

The correlator 41 detects at the long code timing notified from the first stage the correlation values between each long code group identification short code and the real-part amplitude value (I) and imaginary-part amplitude value (Q), which are received by the antenna, quadrature-demodulated by the radio section, and A/D-converted in units of 1/2 chips.

The correlation power value detecting section 42 calculates $I^2+Q^2$ using the respective correlation values obtained from the real- and imaginary-part amplitude values to obtain correlation power values.

To increase the S/N ratio, the inter-frame averaging section 43 averages the respective correlation power values between frames during an arbitrary frame period designated in advance.

The respective correlation power values averaged by the inter-frame averaging section 43 are held in the memory section 44. By using the correlation power values held in the memory section 44, the long code group correlation sum detecting section 45 obtains long code correlation sums according to the transmission pattern of the predetermined respective long code group identification short codes. The long code group correlation sum detecting section 45 obtains the average of the respective correlation sums from which the detected maximum long code correlation sum is excluded, and sets the average as an arbitrary threshold.

If the correlation sum corresponding to the number of long code groups in a given group becomes a maximum value in a given slot, this group is set as a group to which the long code of the received signal belongs. In addition, a slot in which the head of this pattern is obtained is detected as the start slot of the frame.

The determination section 46 shown in FIG. 6 performs determination with the determined threshold. If the maximum correlation sum exceeds the threshold, the long code group detecting section 47 notifies the third stage of the long code group number and frame timing. If the maximum correlation sum does not exceed the threshold, the processing is performed again from the first stage.

An example of the long code detecting section 5, threshold determination section 6, and frame synchronization detecting section 7 shown in FIG. 3 will be described in detail next with reference to FIG. 7.

Figure 7:
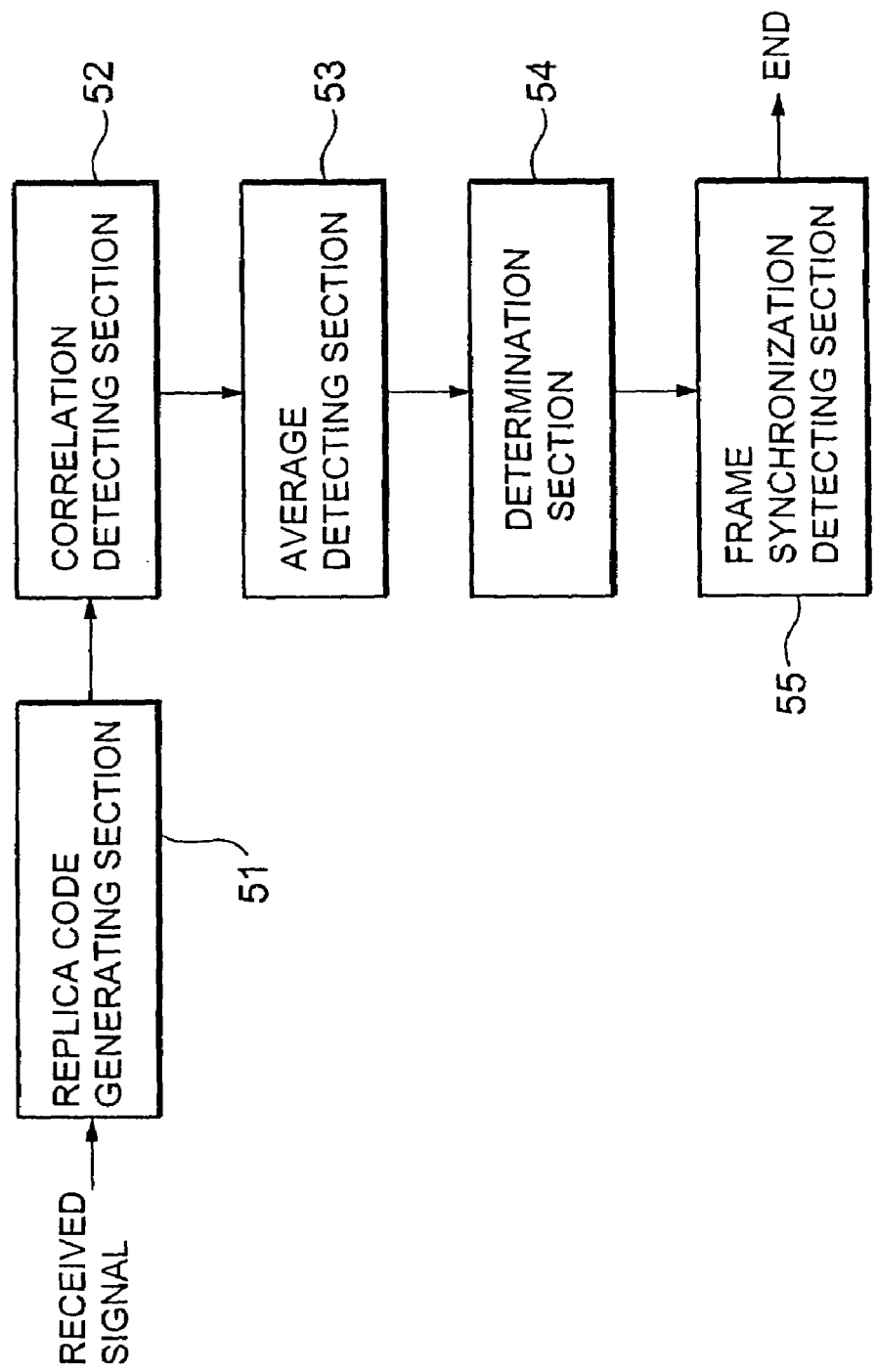
FIG. 7 is a block diagram showing an example of an arrangement in the third stage in the embodiment shown in FIG. 3.

FIG. 7 is a block diagram showing an example of the arrangement of the third stage of the embodiment shown in FIG. 3.

The third stage is comprised of a replica code generating section 51 for generating replica codes of all long code candidates included in the long code group detected by using the frame timing detected in the second stage, a correlation detecting section 52 for detecting the correlation value between the received signal and each replica code detected by the replica code generating section 51, an average detecting section 53 for averaging the correlation values detected by the correlation detecting section 52, a determination section 54 for determining a threshold by comparing each average correlation value with a long code, and a frame synchronization detecting section 55 for performing frame synchronization detection if the long code exceeds the threshold.

The operation of the third stage shown in FIG. 7 will be described in detail next.

In this case, a long code is identified. The replica code generating section 51 generates replica codes of long and short codes for all the long code candidates included in the long code group detected by using the frame timing detected in the second stage. The correlation detecting section 52 detects correlation values for the obtained synchronization timing.

To increase the S/N ratio of each correlation value, the average detecting section 53 performs averaging an arbitrary number of times. The average of the respective average correlation values from which the maximum correlation value is excluded is obtained as a threshold, and a long code that exceeds the threshold is detected.

The determination section 54 determines a threshold by comparing each average correlation value with the long code, thus identifying the long code. If the determination section 54 determines that the long code exceeds the threshold, the frame synchronization detecting section 55 performs frame synchronization detection by using the identified long code.

Frame synchronization is performed by demodulating a sync signal sent from the transmitting side in synchronism with the long code. If this signal is properly demodulated on the receiving side, it is determined that frame synchronization is established, and synchronization of the long code is completed. If none of the correlation detection values based on all the long code candidates exceeds the threshold, it is determined that the cell search has failed, and the flow returns to the first stage to perform a search again. When threshold determination is successful but frame synchronization has failed, the flow also returns to the first stage to perform a search again.

What is claimed is:

1. An initial synchronization method in a DS-CDMA inter-base station asynchronous cellular scheme of transmitting a spreading code sequence comprising a long code unique to each cell and a short code corresponding to each communication channel, an identification code (common identification code) common to each cell in a predetermined period (slot), and a long code group identification short code corresponding to the long code in each cell upon multiplexing the codes, comprising:

a first stage comprising
detecting correlation power values between the common identification code and a received signal by using a correlator, and detecting a long code timing from a corresponding base station on the basis of a maximum value of the correlation power values, and
performing a threshold determination by comparing the maximum correlation power value with a first arbitrary threshold, and performing processing again from the first stage if the maximum correlation power value does not exceed the threshold;

a second stage comprising
detecting a correlation value between the received signal and each long code group identification short code, and obtaining a sum of the correlation values corresponding to the number of long code group identification short codes in each slot according to a transmission pattern of long code group identification short codes in each predetermined long code group,
setting a group having a maximum correlation sum as a group to which a long code of the received signal belongs,
detecting a slot in which a head of the pattern is obtained as a start slot of a frame, and
comparing a second arbitrarily set threshold with the maximum correlation sum and performing processing again from the first stage if the maximum correlation sum does not exceed the threshold; and a third stage comprising
sequentially generating replica codes of long codes and short codes from long code candidates included in the long code group identified in the second stage,
performing correlation detection for the obtained synchronization timing,
performing long code correlation detection to check whether the correlation detection value exceeds a third arbitrary threshold,
returning to the first stage if none of correlation detection values of all long codes exceeds the threshold, and
determining a long code exceeding the threshold as a long code of a target cell, performing synchronization detection by using a frame sync signal, completing initial synchronization if synchronization is detected, and returning to the first state if synchronization is not detected;

wherein at least one of said first, second and third arbitrary thresholds is set after at least one of said correlation power values, said maximum correlation sum and a maximum correlation detection value, are excluded.

2. A method according to claim 1, wherein the threshold determination in the first stage comprises obtaining an average of correlation power values, from which given correlation values ranging from the maximum correlation power value to a correlation power value of an arbitrary ordinal number correlation value and correlation values before and after the given correlation power values are excluded, and setting the average as an arbitrary threshold.

3. A method according to claim 1, wherein the threshold determination in the second stage comprises obtaining an average of the respective correlation sums, from which the detected maximum correlation sum is excluded, and setting the average as an arbitrary threshold.

4. A method according to claim 1, wherein identification of a long code in the third stage comprises
sequentially generating replica codes of long codes and short codes from long code candidates included in the identified long code group,
performing correlation detection for an obtained synchronization timing,
detecting correlation values of long codes to check whether the correlation detection value exceeds an arbitrary threshold,
returning to the first stage if none of the correlation detection values of the long codes exceeds the threshold,
determining a long code as a long code in a target cell if the long code exceeds the threshold,
performing synchronization detection by using a frame sync signal,
determining completion of initial synchronization if synchronization is detected, and
returning to the first stage if synchronization is not detected.

5. A method according to claim 1, wherein threshold determination in the third stage comprises obtaining an average of the respective correlation detection values, from which a detected maximum correlation detection value is excluded, and setting the average as an arbitrary threshold.

6. A DS-CDMA cellular system using an initial synchronization method in a DS-CDMA inter-base station asynchronous cellular scheme of transmitting a spreading code sequence constituted by a long code unique to each cell and a short code corresponding to each communication channel, an identification code (common identification code) common to each cell in a predetermined period (slot), and a long code group identification short code corresponding to the long code in each cell upon multiplexing the codes, comprising:

a first section comprising
means for detecting correlation power values between the common identification code and a received signal by using a correlator, and detecting a long code timing from a corresponding base station on the basis of a maximum value of the correlation power values, and
means for performing threshold determination by comparing the maximum correlation power value with a first arbitrary threshold, and performing processing again from processing in said first section if the maximum correlation power value does not exceed the threshold;

a second section comprising means for detecting a correlation value between the received signal and each long code group identification short code, and obtaining a sum of the correlation values corresponding to the number of long code group identification short codes in each slot according to a transmission pattern of long code group identification short codes in each predetermined long code group, means for setting a group having a maximum correlation sum as a group to which a long code of the received signal belongs, means for detecting a slot in which a head of the pattern is obtained as a start slot of a frame, and means for comparing a second arbitrarily set threshold with the maximum correlation sum and performing processing again from processing in said first section if the maximum correlation sum does not exceed the threshold; and a third section comprising means for sequentially generating replica codes of long codes and short codes from long code candidates included in the long code group identified in said second section, means for performing correlation detection for the obtained synchronization timing, means for performing long code correlation detection to check whether the correlation detection value exceeds a third arbitrary threshold, means for returning to processing in said first section if none of correlation detection values of all long codes exceeds the threshold, and means for determining a long code exceeding the threshold as a long code of a target cell, performing synchronization detection by using a frame sync signal, completing initial synchronization if synchronization is detected, and returning to processing in the first state if synchronization is not detected;

wherein at least one of said first, second and third arbitrary thresholds is set after at least one of said correlation power values, said maximum correlation sum and a maximum correlation detection value, are excluded.

7. A system according to claim 6, wherein said first section comprises means for obtaining an average of correlation power values, from which given correlation values ranging from the maximum correlation power value to a correlation power value of an arbitrary ordinal number correlation value and correlation values before and after the given correlation power values are excluded, and setting the average as an arbitrary threshold.

8. A system according to claim 6, wherein said second section comprises means for obtaining an average of the respective correlation sums, from which the detected maximum correlation sum is excluded, and setting the average as an arbitrary threshold.

9. A system according to claim 6, wherein said third section comprises means for sequentially generating replica codes of long codes and short codes from long code candidates included in the identified long code group, performing correlation detection for an obtained synchronization timing, detecting correlation values of long codes to check whether the correlation detection processing in said first section if none of the correlation detection values of the long codes exceeds the threshold, determining a long code as a long code in a target cell if the long code exceeds the threshold, performing synchronization detection by using a frame sync signal, determining completion of initial synchronization if synchronization is detected, and returning to processing in said first section if synchronization is not detected.

10. A system according to claim 6, wherein said third section comprises means for obtaining an average of the value exceeds an arbitrary threshold, returning to respective correlation detection values, from which a detected maximum correlation detection value is excluded, and setting the average as an arbitrary threshold.

* * * * *